United States Patent [19]
Gibbons et al.

[11] Patent Number: 6,047,200
[45] Date of Patent: Apr. 4, 2000

[54] REMOTE WIRELESS UNIT HAVING REDUCED POWER OPERATING MODE

[75] Inventors: David Gibbons, Redmond; James Timothy Golden, Carnation, both of Wash.

[73] Assignee: AT&T Wireless Services, Redmond, Wash.

[21] Appl. No.: 09/222,895

[22] Filed: Dec. 30, 1998

Related U.S. Application Data

[62] Division of application No. 08/796,586, Feb. 6, 1997.

[51] Int. Cl.[7] ........................................... H04B 1/16
[52] U.S. Cl. ..................... 455/574; 455/575; 455/343; 455/38.3
[58] Field of Search ................... 455/572–575, 455/67.1, 343, 127, 38.3, 517

[56] References Cited

U.S. PATENT DOCUMENTS

| | | | |
|---|---|---|---|
| 5,410,740 | 4/1995 | Hagstrom | 455/67.1 |
| 5,438,329 | 8/1995 | Gastouniotis et al. | 455/67.1 |
| 5,509,015 | 4/1996 | Tiedemann, Jr. et al. | |
| 5,661,780 | 8/1997 | Yamamoto et al. | 455/573 |

OTHER PUBLICATIONS

Vandendorpe L. et al, "Analysis of Residual Interference After MSE Linear Equalization of Multitone Spread Spectrum Signals", Communications—Gateway to Globalization Proceedings of the Conference on Communications, Seattle, Jun. 18–22, 1995, vol. 3, pp. 1673–1677.

Vandendorpe L. et al., "Performance Analysis of Linear Joint Multiple Access Interference Cancellation–Equalization for Asynchronous Multitone CDMA" IEEE, Sep. 25, 1995, pp. 537–541, XP000610292.

*Primary Examiner*—Doris H. To

[57] ABSTRACT

A remote unit for a personal wireless area network includes a receiver, an AC power supply, a battery-backup power supply and a controller. The battery-backup becomes operative when the AC power supply fails and supplied power to the receiver. The controller detects when the AC power supply fails and controls the receiver and the battery-backup power supply by invoking a sleep mode of operation. The sleep mode of operation is periodically interrupted by the controller controlling the receiver and the battery-backup power supply to enter a standby mode of operation in which the receiver scans for a CONNECT message from a base station indicating an incoming call. The controller coordinates the sleep mode and the standby mode of operations based on a frame count that is generated from an identification number of the remote unit. A highly bandwidth-efficient communications method is employed in the base station to enable it to coordinate communication with the remote unit when it changes from the sleep mode to the standby mode.

10 Claims, 8 Drawing Sheets

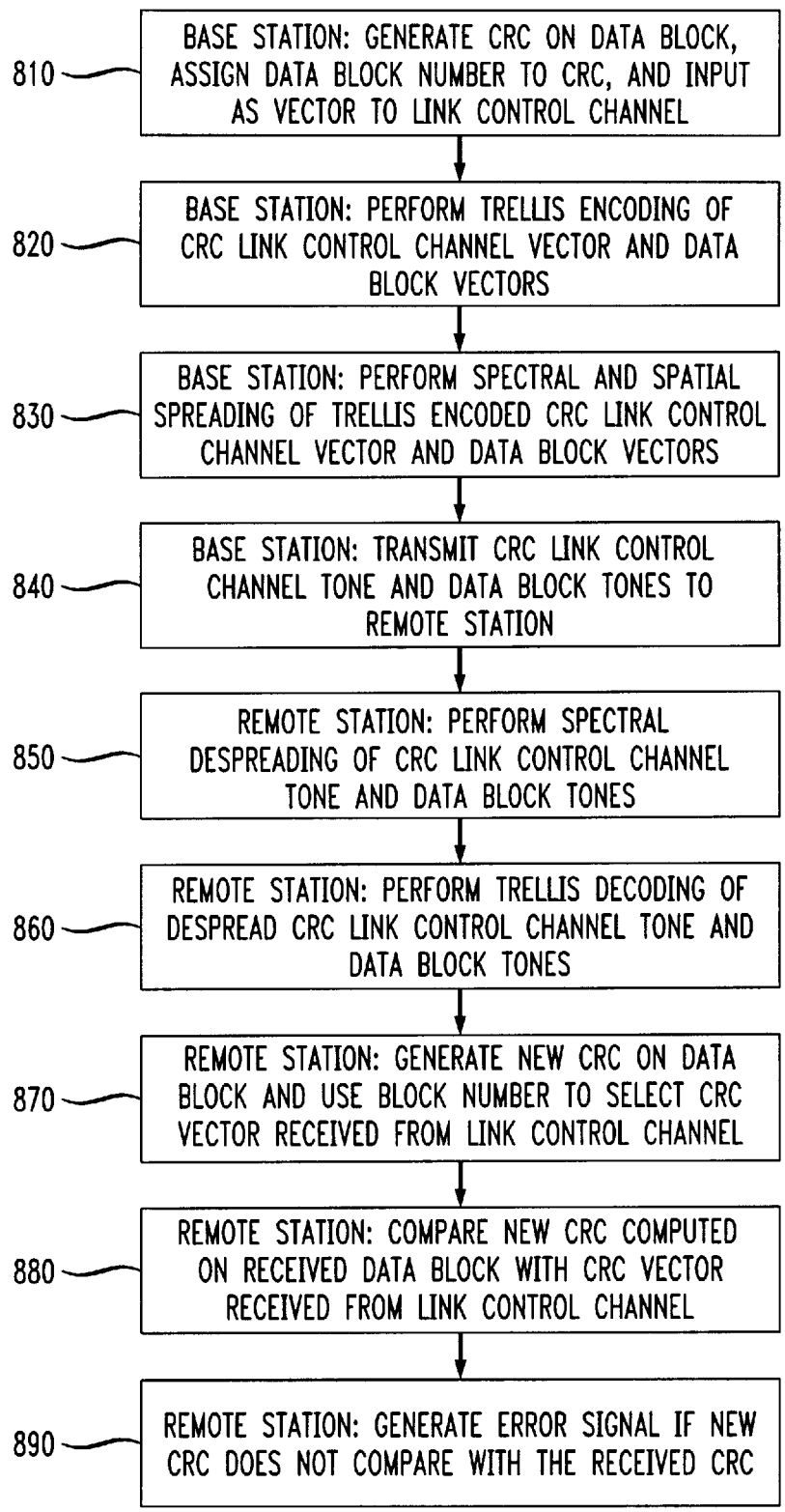
FIG. 8    800

REMOTE WIRELESS UNIT HAVING REDUCED POWER OPERATING MODE

CROSS-REFERENCE TO RELATED APPLICATIONS

This is a divisional of co-pending application Ser. No. 08/796,586, filed Feb. 6, 1997 The invention disclosed herein is related to the co-pending U.S. patent application by Siavash Alamouti, Doug Stolarz, and Joel Becker, entitled "VERTICAL ADAPTIVE ANTENNA ARRAY FOR A DISCRETE MULTITONE SPREAD SPECTRUM COMMUNICATIONS SYSTEM", Ser. No. 08/806,510, filed on Feb. 24, 1997, assigned to AT&T Wireless Services Inc., and incorporated herein by reference.

BACKGROUND OF THE INVENTION

1. FIELD OF THE INVENTION

The present invention relates to improvements to communications systems. More particularly, the present invention relates to wireless discrete multitone spread spectrum systems.

The remote units are powered primarily from AC power sources and include a battery for providing battery backup power when AC power fails. To conserve battery power, an RU has a sleep mode of operation with periodic power-up modes for checking whether any calls are attempting to be connected to the RU. When an RU is in a sleep mode, it expedient that the system operate in such a way so that appropriate actions are taken for completing a call to a sleep mode RU.

One approach for ensuring that calls are completed to a remote unit operating in a sleep mode is to maintain a database at a central location that stores the current operating mode of each remote in the system. When a remote unit enters a sleep mode of operation, the remote unit reports the change of operational status to the database. Similarly, the remote unit reports a change of status back to a standby operating mode. This approach has a drawback when a number of remote units recorded in the database experience frequent power outages. In such a situation, recording, managing and synchronizing power outage information in the database is particularly cumbersome when the database is large, perhaps holding status information for 3 to 4 thousand remote units. This drawback is further compounded when the database is duplicated multiple times throughout the system. When several thousand subscribers experience a power outage and AC power is restored before the database has completed recording the power outage, a database approach becomes unwieldy. Another complicated situation is when multiple remote units lose power at the same time. The affected remote units cannot all access the channel simultaneously for communicating their status to the database. A collision avoidance scheme must be implemented that spans a period of time and that is open for the possibility of power being restored before the database has been completely revised.

This approach has another drawback in that a remote unit entering the sleep mode consumes system bandwidth in notifying the database. FIG. 4 shows an exemplary flow of internal messaging that occurs between various layers of a remote unit when loss of AC power is detected and a database is notified of the operational status change. Time is shown along the vertical axes of FIG. 4, with advancing time being indicated toward the bottom of FIG. 4. In FIG. 4, four layers of the remote unit operating system are shown: Health; OAM&P (Operations, Administration, Maintenance & Provisioning), MAC (Media Access Control) and physical. Only MAC layer of the base station is shown. At 40, AC power failure is detected by the Health layer. At 41, an EVENT message is sent from the Health layer to the OAM&P layer indicating that AC power has failed. The OAM&P layer sends an ACTION message to the MAC layer at 42. The MAC layer responds at 43 by sending an ACTION_RSP message to the OAM&P layer indicating that base station notification is pending. At 44, the MAC layer waits a random length period of time before sending an unsolicited CAC message at 45 to the MAC layer of the base station indicating the need for the remote unit to enter the sleep mode. At 46, the MAC layer of the base station sends an acknowledgment message to the MAC layer of the remote unit acknowledging receipt of the unsolicited CAC message. In response, the MAC layer of the remote unit sends an EVENT message at 47 to the OAM&P layer that the notification is done. The OAM&P layer first sends an EVENT message to the MAC layer indicating that the sleep mode has been entered at 48, and then sends a message at 49 to the physical layer to power down.

What is needed is a way for a PWAN system to be aware that a remote unit is operating in a sleep mode so that appropriate actions can be taken by the system so that calls can be completed to a remote unit operating in a sleep mode.

SUMMARY OF THE INVENTION

The present invention provides a method for reducing power consumption of a remote unit in a PWAN system. A remote unit is powered using a battery backup power supply when an AC power supply fails at the remote unit. A sleep mode of operation is entered at the remote unit that has a reduced power consumption for the battery backup power supply. The remote unit is synchronized to a TDD timing structure a predetermined period of time after entering the sleep mode of operation. A standby mode of operation is then entered at the remote unit in which a CONNECT message indicating an incoming call for the remote unit is scanned for by the receiver. When no CONNECT message is received, the remote unit reenters the sleep mode of operation. According to the invention, the predetermined period of time is a predetermined number of subframes after a boundary subframe of the TDD timing structure. Preferably, the predetermined number of subframes is based on an identification number of the remote unit.

The present invention also provides a remote unit for a personal wireless area network that includes a receiver, an AC power supply, a battery-backup power supply and a controller. The battery-backup becomes operative when the AC power supply fails and supplies power to the receiver. The controller detects when the AC power supply fails and controls the receiver and the battery-backup power supply by invoking a sleep mode of operation. The sleep mode of operation is periodically interrupted by the controller controlling the receiver and the battery-backup power supply to enter a standby mode of operation in which the receiver scans a CONNECT message indicating an incoming call. The controller coordinates the sleep mode and the standby mode of operations based on a frame count that is generated from an identification number of the remote unit.

In accordance with another aspect of the invention, a highly bandwidth-efficient communications method is disclosed for the base station to enable it to communicate with a remote unit that is in the sleep mode. The remote unit has a unique identification value that is different from the identification value of other remote units that may be communicating with the base station. The base station begins by establishing a periodic reference instant at the base station and at the remote station. Then the base station determines a delay interval following the periodic reference instant at the base station, the delay interval being derived from the unique identification value of the remote unit. The base station receives spread signals from the remote units with which it communicates, each comprising an incoming data traffic signal spread over a plurality of discrete traffic frequencies. The base station adaptively despreads the signals received it receives by using despreading weights. The base station attempts to initiate a communication with the remote unit that is currently in the sleep mode. If the attempting step fails to initiate communications with the remote unit, the base station concludes that the remote unit is in the sleep mode. In response to this, the base station waits for the delay interval following the periodic reference instant at the base station before transmitting to the remote unit. The base station then transmits to the remote unit a spread signal comprising an outgoing data traffic signal spread over a plurality of discrete traffic frequencies. The remote unit has simultaneously changed from the sleep mode to the standby mode and is able to receive and respond to the spread signal transmitted from the base station.

In accordance additional aspects of the invention, the base station is part of a wireless discrete tone communications system. Further, the periodic reference instant is established by a beginning subframe count instant that is incremented by a packet count value at the base station and at the remote unit. In addition, the delay interval is determined by a value N of a quantity of M least significant bits of the unique identification value of the remote unit, the delay interval being an interval required for the occurrence of a plurality of N of the beginning subframe count instants. The resulting invention enables the base station to be aware that a remote unit is operating in a sleep mode so that appropriate actions can be taken by the base station to assure that calls can be completed to the remote unit.

BRIEF DESCRIPTION OF THE DRAWINGS

The present invention is illustrated by way of example and not limitation in the accompanying figures in which like reference numerals indicate similar elements and in which:

FIG. 8 is an architectural diagram of the base station Z.

DESCRIPTION OF THE PREFERRED EMBODIMENT

Figure 1:
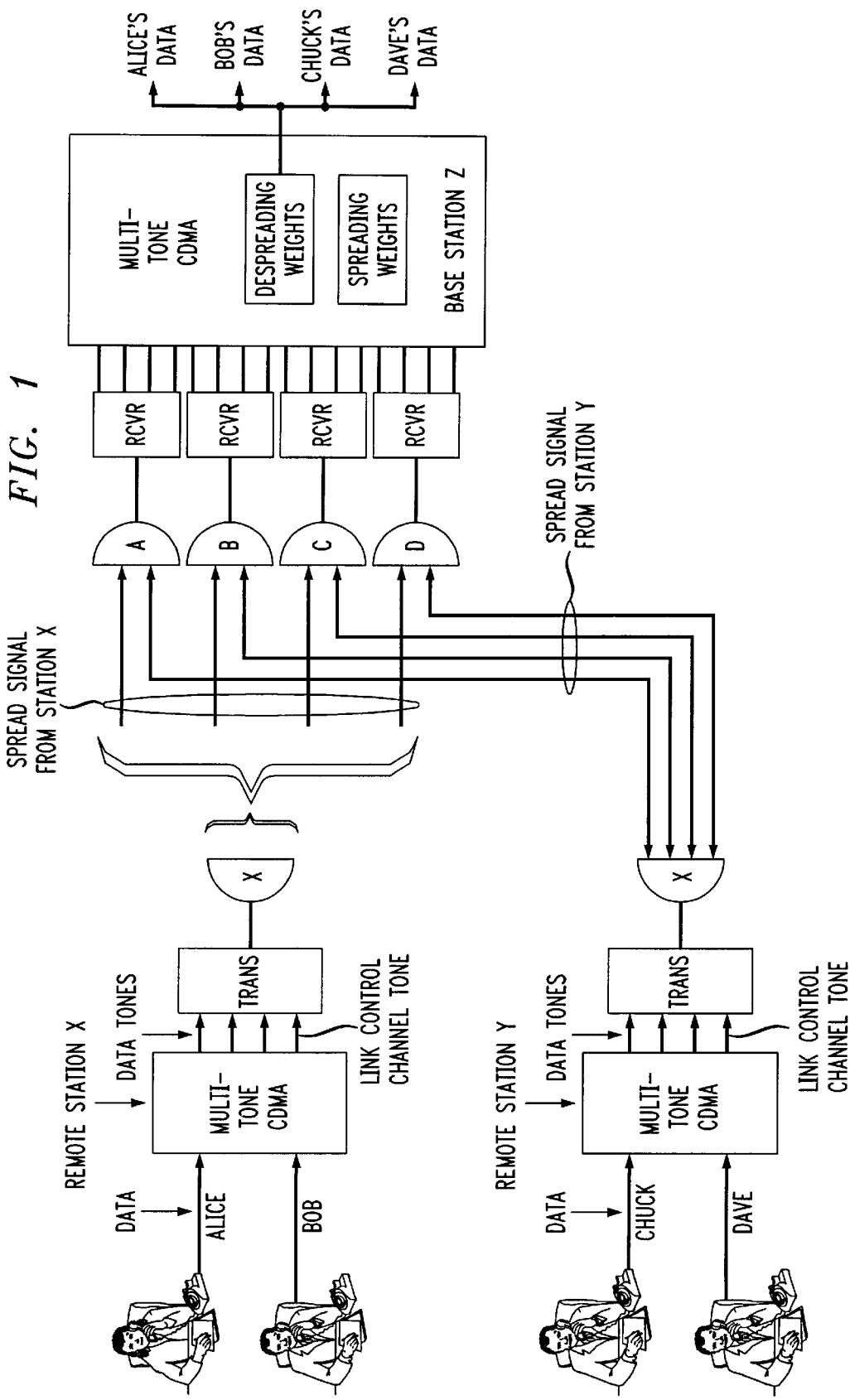
FIG. 1 is an architectural diagram of the PWAN system, including remote stations transmitting to a base station.

FIG. 1 shows an architectural diagram of the personal wireless access network (PWAN) system described in the referenced Alamouti et al. patent application and which is the environment of the present invention. Two users, Alice and Bob, are located at a remote station unit, or remote unit (RU), X and wish to transmit their respective data messages to a base station Z. Remote unit X is positioned to be equidistant from each of antenna elements A, B, C, and D at base station Z. Two other users, Chuck and Dave, are located at a remote station unit Y and also wish to transmit their respective data messages to base station Z. Remote unit Y is geographically different from remote unit X and is not equidistant from each of antenna elements A, B, C, and D of base station Z. Remote units X and Y, and base station Z use a form of the PWAN protocol known as discrete tone which is used for providing efficient communications between base stations and remote units. The protocol is indicated in FIG. 1 as a discrete tone.

In the protocol, a user data signal is modulated by a set of weighted discrete frequencies or tones. The weights are spreading weights that distribute the data signal over many discrete tones covering a broad range of frequencies. The weights are complex numbers having a real component that is used for modulating the amplitude of a tone and a complex component that is used for modulating the phase of the same tone. Each tone in the weighted-tone set bears the same data signal. Plural users at a transmitting station can use the same tone set for transmitting their data, but each of the users sharing the tone set has a different set of spreading weights. The weighted-tone set for a particular user is transmitted to the receiving station where it is processed with despreading weights that are related to the user's spreading weights for recovering the user's data signal. For each of a plurality of spatially separated antennas at the receiver, the received discrete tone signals are transformed from time-domain signals to frequency-domain signals. Despreading weights are assigned to each frequency component of the signals that are received by each antenna element. The values of the despreading weights are combined with the received signals for obtaining an optimized approximation of individual transmitted signals characterized by a particular discrete tone set and transmitting location.

The PWAN system has a total of 2560 discrete tones (carriers) that are equally spaced in 8 MHZ of available bandwidth in the frequency range of 1850 to 1990 MHZ, with a spacing between the tones of 3.125 KHz. The tones are used for carrying traffic messages and overhead messages between the base station and the plurality of remote units. The total set of tones are numbered consecutively from 0 to 2559, starting from the lowest frequency tone. The tones used for traffic messages are divided into 32 traffic partitions, with each traffic channel requiring at least one traffic partition of 72 tones.

The overhead message tones are used for establishing synchronization and for passing control information between base stations and remote units. A Common Link Channel (CLC) is used by a base station for transmitting control information to remote units. A Common Access Channel (CAC) is used by a remote unit for transmitting messages to the base station. There is one grouping of tones assigned to each channel. The overhead channels are used in common by all remote units when control messages are exchanged with a base station.

Transmission from a base station to a remote unit is called "forward transmission" and transmission from a remote unit to a base station is called "reverse transmission". Time Division Duplexing (TDD) is used by base stations and remote units for transmitting data and control information in both directions over the same discrete tone frequency channel. The time between recurrent transmissions in either direction is called a TDD period which, is equal to 3 ms. For every TDD period, there are four consecutive transmission bursts in each direction. Data is transmitted during each burst using multiple tones. The base station and each remote unit synchronize and conform to a TDD timing structure and framing structure that has 1 frame equal to 8 subframes and 1 subframe equal to 2 TDD periods. A superframe is 256 subframes, or 1536 ms. All remote units and base stations are synchronized such that all remote units transmit simultaneously and then all base stations transmit simultaneously. When a remote unit initially powers up, it acquires synchronization from a base station so that control and traffic messages can be exchanged within the prescribed TDD time format. A remote unit must also acquire frequency and phase synchronization for the DMT-SS signals so that the remote unit is operating at the same frequency and phase as an associated base station.

Selected tones within each tone set are designated as pilot tones that are distributed throughout the frequency band and carry known data patterns for enabling an accurate channel estimation. A series of pilot tones, having known amplitudes and phases, are spaced apart in frequency by approximately 30 KHz for providing an accurate representation of a channel response over the entire transmission band, that is, the amplitude and phase distortion introduced by the communication channel characteristics over the transmission band.

Figure 2:
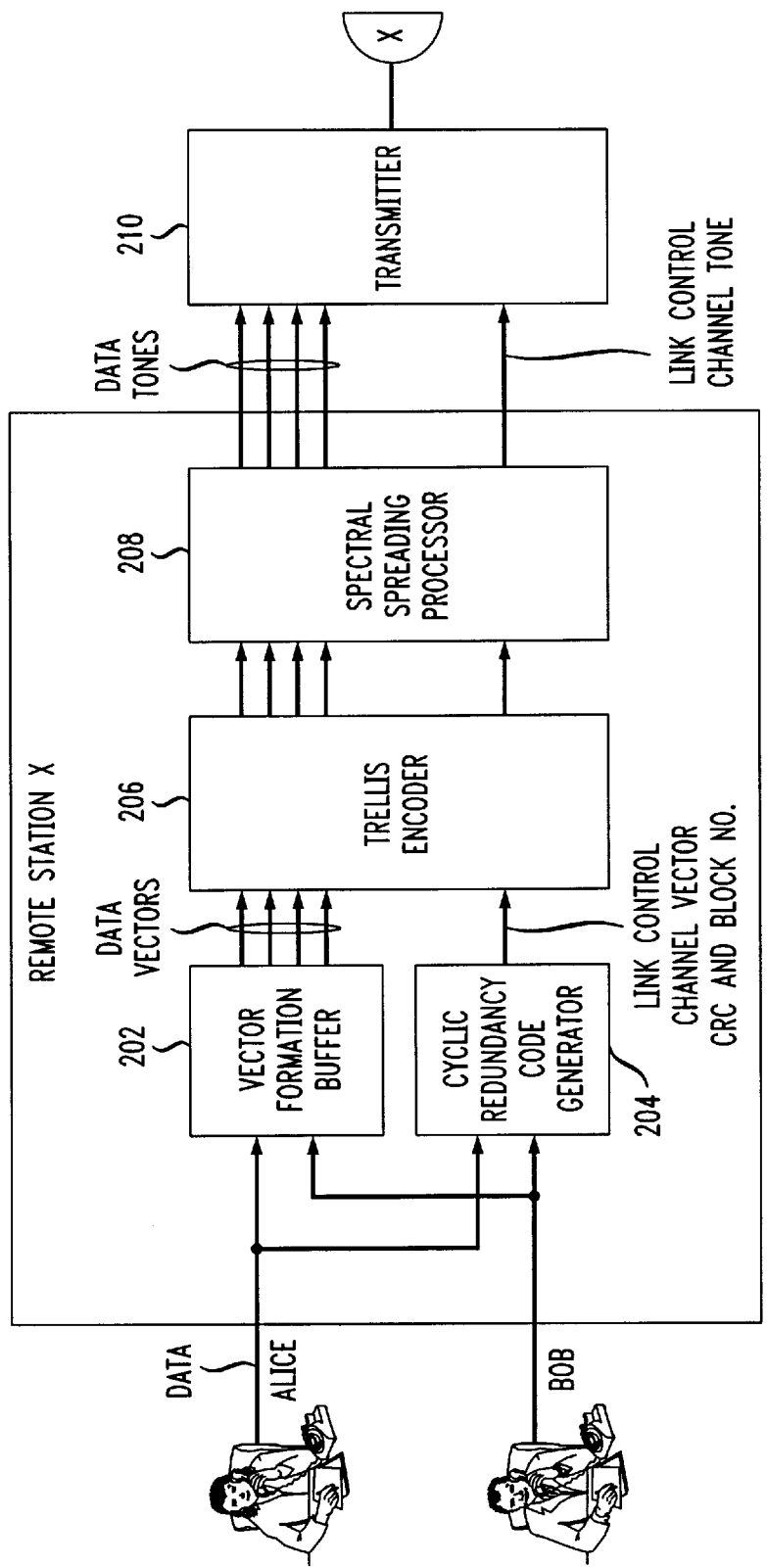
FIG. 2 is an architectural diagram of the remote station X as a sender.

FIG. 2 shows an architectural diagram of remote station X operating as a sender station. Alice and Bob each input data to remote station X. The data is sent to a vector formation buffer 202 and also to a cyclic redundancy code generator 204. Data vectors are output from buffer 202 to a trellis encoder 206. The data vectors are in the form of a data message formed by concatenating a 64 K-bit data block with a serially assigned block number. CRC generator 204 generates LCC vectors that are output to trellis encoder 206. The LCC vectors are in the form of an error detection message formed by concatenating a CRC value with the serially assigned block number of the data block. The trellis encoded data vectors and LCC vectors are then output to a spreading processor 208. The resultant data tones and LCC tones are then output from processor 208 to a transmitter 210 for transmission to the base station.

The personal wireless access network (PWAN) system is described in the cross-referenced Alamouti et al. patent application. A base station transmits information to multiple remote units that are located in the base station's cell.

Figure 3:
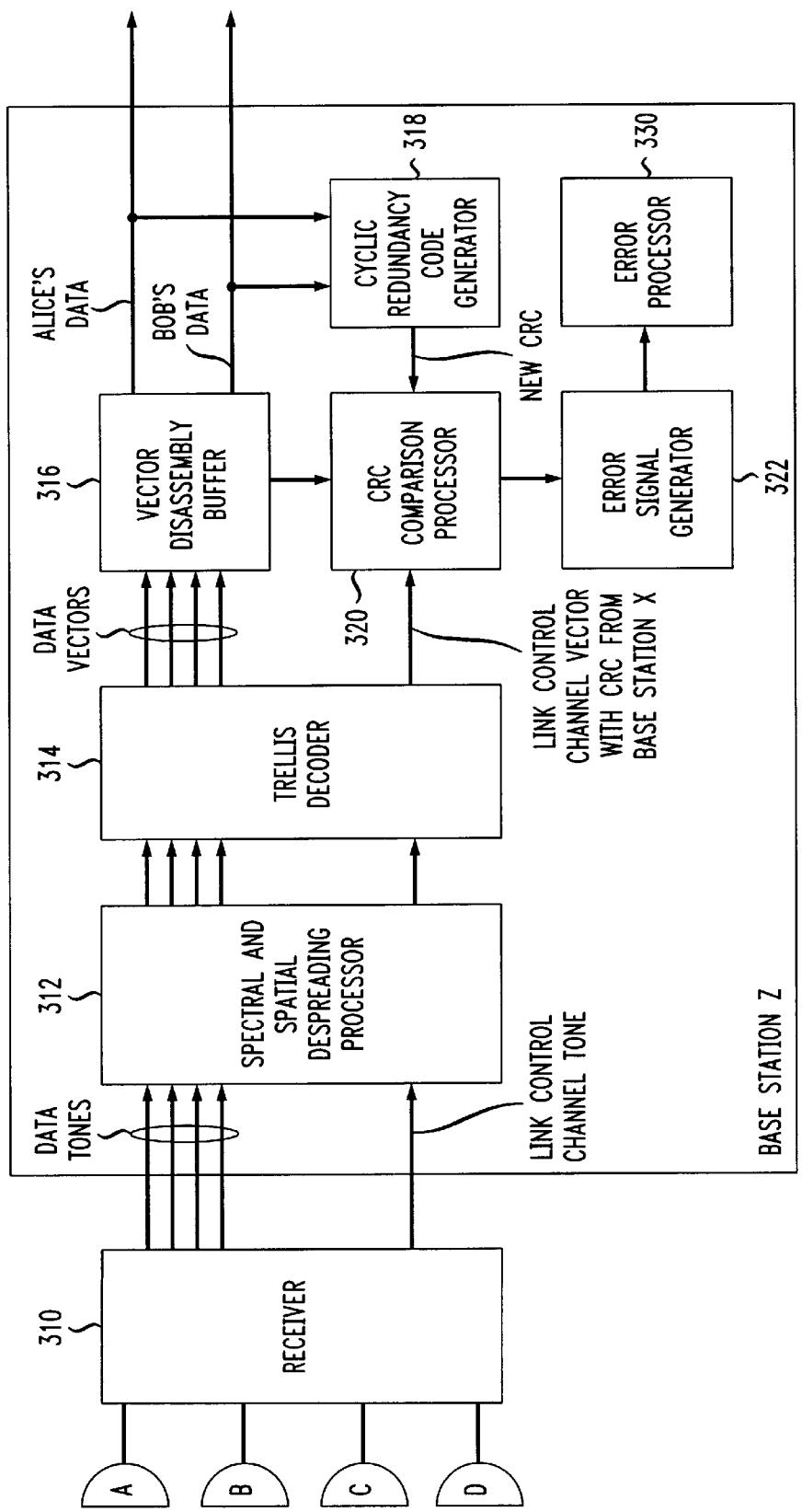
FIG. 3 is an architectural diagram of the remote station X as a receiver.
Figure 4:
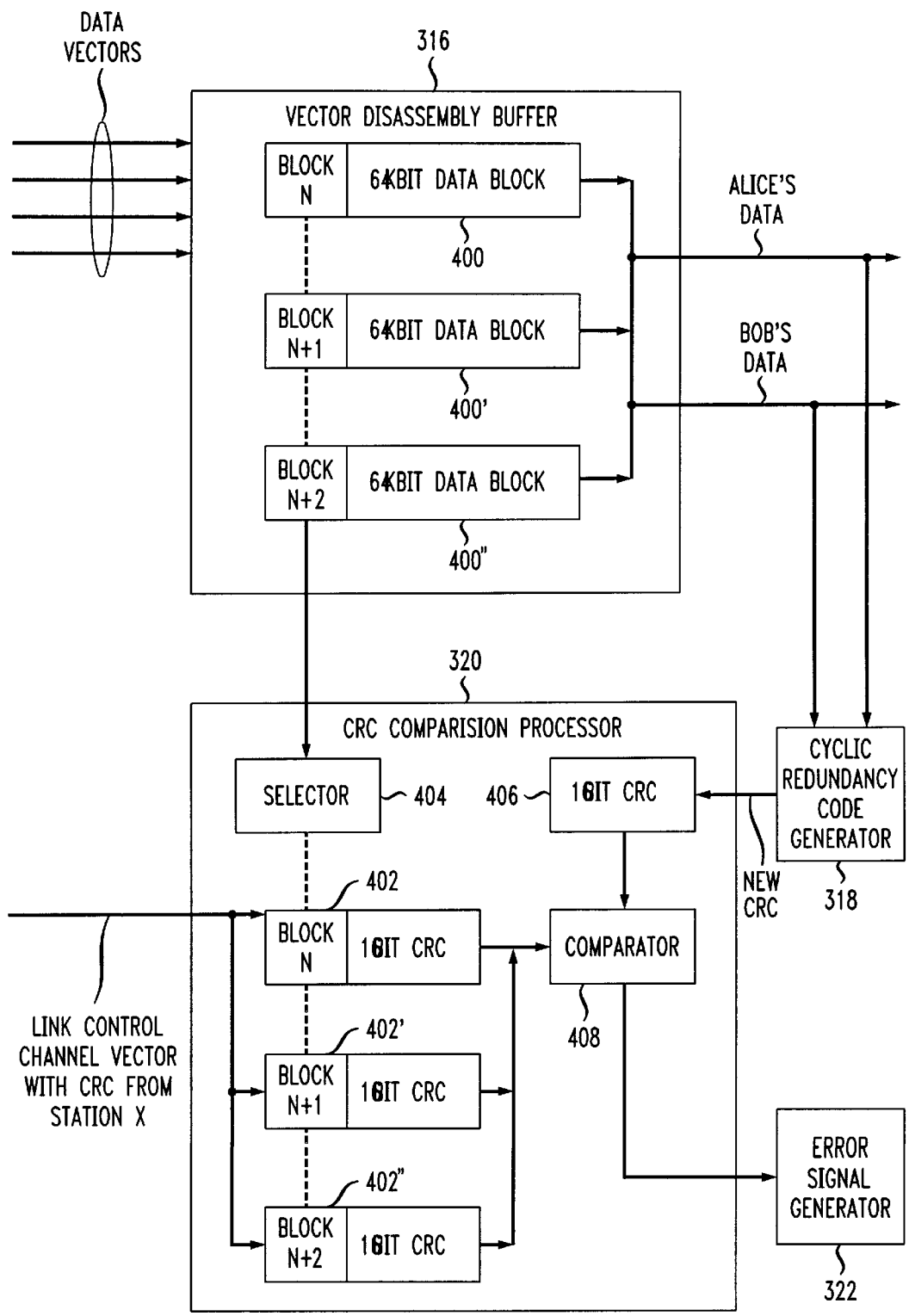
FIG. 4 shows an exemplary messaging flow occurring between various layers of an exemplary remote unit and through an airlink to a base station when a loss of AC power at the remote unit is detected.

FIG. 3 is an architectural block diagram of remote station X operating as a receiving station. Data tones and LCC tones are received by remote station antenna X and a receiver 610. Receiver 610 passes the data tones and the LCC tones to a spectral despreading processor 612 which despreads the data tones and LCC tones. The despread signals are then output from processor 612 to a trellis decoder 614. Trellis decoder 614 generates data vectors from the despread signals. The data vectors are then output to a vector disassembly buffer 616. Data for Alice and data to Bob are output from buffer 616 to Alice and Bob, respectively. Data for Alice and Bob are also input to a CRC generator 618. CRC generator 618 computes a new CRC value for every 64 K-bit data block and outputs the new CRC value with the block number to a buffer within a CRC comparison processor 620. The receiving station buffers error detection messages that are received from the link control channel in CRC comparison processor 620 so that the error detection messages are accessible by their block numbers N, N+1, N+2, etc. When the receiving station receives a data message on the traffic channel, it performs a CRC calculation on the data block in the message with CRC generator 618 for obtaining a resulting new CRC value. If the comparison determines that there is a difference in the values, then an error signal is generated by an error signal generator 622. The error signal can be processed and used in several ways by an error processor 630. For example, the error signal can initiate a negative acknowledgment signal that is to be sent from the receiving station back to the sender station requesting that the sender repeat transmission of the data block. The error signal can also initiate an update in spreading and despreading weights at the receiving station for improving the signal-to-interference and noise ratio of the traffic channel. Another use of the error signal is for initiating an alarm used for other real time control. Yet another use of the error signal is as part of a logging signal for compilation of a long term report relating to traffic channel quality.

According to the invention, a remote unit includes a standby mode of operation and a sleep mode of operation. Normally, the standby mode is the mode in which a remote unit scans the CLC channel for a CONNECT message for the remote unit. The sleep mode of operation provides a reduced power consumption operating mode for extending remote unit battery runtime during an AC power outage condition. During the sleep mode of operation, the remote unit periodically switches between the standby mode and sleep mode, with the overall effect being a reduction in the average power required by the remote unit.

Delivery of a CONNECT message to a remote unit operating in the sleep mode is scheduled so that the remote unit is in the standby portion of the sleep mode. That is, the remote unit is synchronized and ready for receiving data from the CLC when the base station begins transmitting on the CLC. In order to achieve synchronization, a system wide Packet Count (PKT_CNT) is used. The basic unit of measure for synchronization is a mod[8 ] PKT_CNT, which is called a subframe count (SUBFRM_CNT). The SUBFRM_CNT is incremented every 256 PKT_CNTs, or every 6 ms.

The base station and the remote unit both preferably use the least significant 8 bits of the remote unit ID for determining the particular SUBFRM_CNT at which the CLC CONNECT message should be sent to the remote unit and, simultaneously, the appropriate time at which the remote unit should be in the standby portion of the sleep mode for receiving the CONNECT message. When the least significant 8 bits of the remote unit ID are used, the remote unit enters the standby mode once every 256 subframes and is ready for receiving an incoming call. The particular subframe that a remote unit will be ready for receiving an incoming call is called the $N_{listen}$ for the remote unit.

To avoid using a remote unit power status database that is maintained at a central location, the sleep mode features of the present invention are preferably implemented as part of a standard terminating call retry mechanism. That is, when a terminating call request is received at the base station MAC Layer, the MAC Layer Access Manager proceeds normally through a terminating call setup procedure by transmitting a CONNECT message on the CLC to the target remote unit. In the situation when the target remote unit is operating in the sleep mode at the time of the CONNECT message transmission, the remote unit will generally be unable to process the message. The base station MAC Layer Access Manager will time-out and retry transmission of the CONNECT message. Preferably, a retry timer $T_r$ is nominally set to 72 ms. The base station MAC Layer Access Manager retries the CONNECT message for a predetermined number of tries that is set by a system manager. Preferably, the retry count is 2.

When the number of retries equals the retry count, the base station MAC Layer Access Manager determines that the remote unit is in the sleep mode and, consequently, attempts to deliver the CONNECT message at a scheduled time that is based on the target remote unit ID. The scheduled time is a subframe occurring $N_{listen}$ subframes after the boundary subframe for the TDD timing structure.

The base station MAC Layer Access Manager also reserves the CLC slot(s) required for completing the CLC CONNECT message transmission at the time the $N_{listen}$ subframe number is derived. That is, when the base station MAC Layer Access Manager has reached its retry count for a CONNECT message and has determined the $N_{listen}$ subframe, CLC slot availability is examined for reserving the appropriate CLC slot(s) for use. As an alternative, a remote unit can scan up to 3 CLC slots for a CONNECT message when in the sleep mode so that a base station can select from 3 CLC slots in case a specific slot is unavailable.

Figure 5:
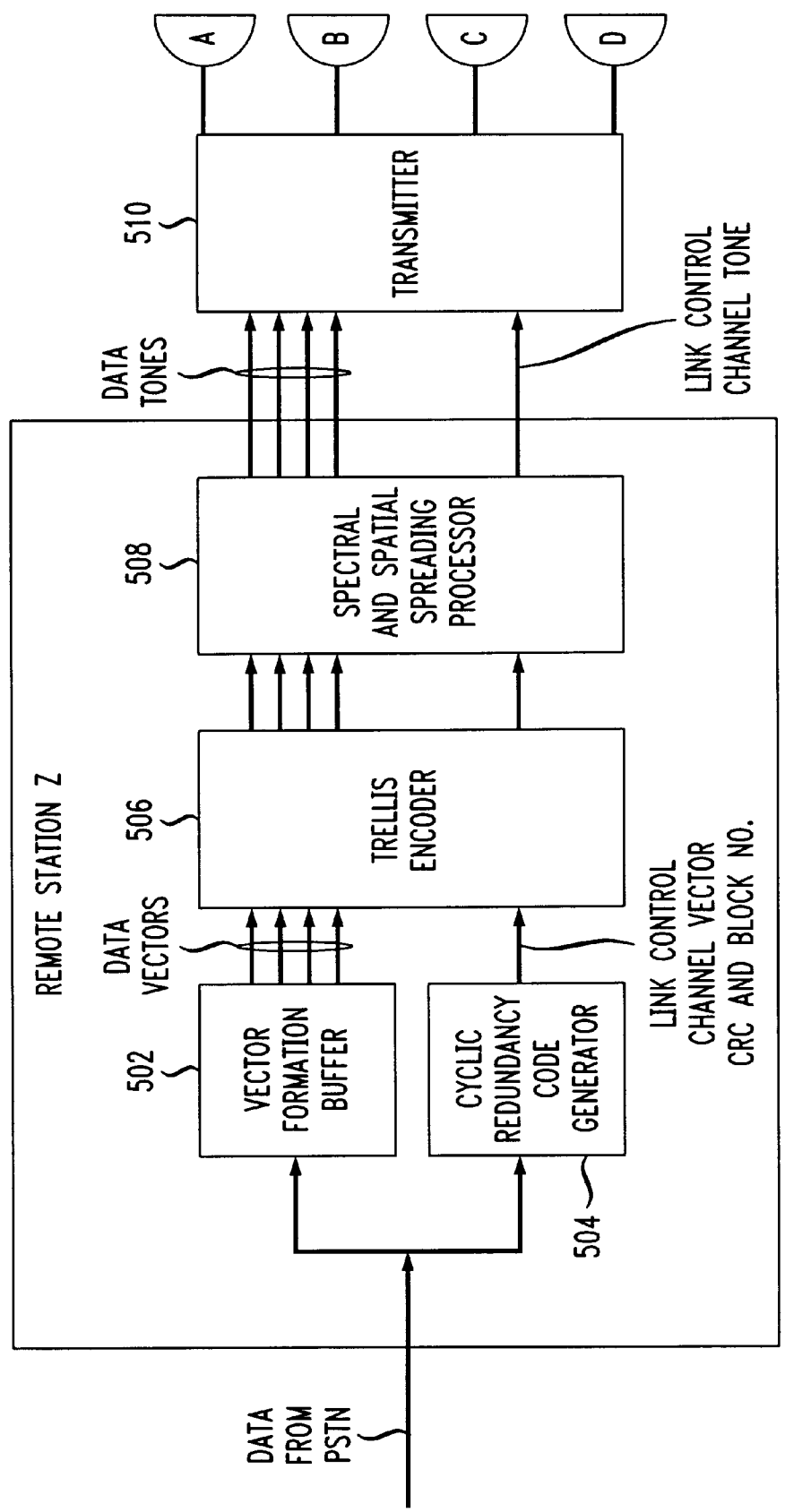
FIG. 5 shows a message flow sequence for a terminating call for the situation when a target remote unit is operating in the sleep mode.

FIG. 5 shows a message flow sequence for a terminating call for the situation when a target remote unit is operating in the sleep mode. The MAC Layer of the base station receives a terminating call request at 50. At 51, the MAC Layer of the base station sends a CLC CONNECT message to the target remote unit. Since the remote unit is in the sleep mode, it does not receive the CLC CONNECT message and, therefore, does not respond. Since there is no response from the target remote unit during the $T_{retry}$ period 52, the MAC Layer of the base station sends a second CLC CONNECT message to the target remote unit at 53. The remote unit does not respond during $T_{retry}$ 54, so the MAC Layer of the base station determines the $N_{listen}$ subframe for the remote unit using the least significant 8 bits of the remote unit ID and waits for the particular $N_{listen}$ subframe at 55. At $N_{listen}$ for the remote unit, the MAC Layer of the base station sends a CLC CONNECT message at 56. At $N_{listen}$, the remote unit is in the standby mode and ready to receive the CLC CONNECT message at 57. In response, the remote unit MAC Layer sends a CAC_ACK message to the base station at 58.

The following definitions are used for describing the sleep mode of operation of the present invention:

$T_{sleep}$=the time that a remote unit is in a low-power mode (i.e., sleeping).

$T_{sync}$=the time required by a remote unit for re-acquiring synchronization when exiting the sleep mode.

$T_{scan\_clc}$=the time that a remote unit is operating in a standby mode scanning the CLC for a CONNECT message.

$T_{standby}$=the total time a remote unit is running (i.e., $T_{sync}+T_{scan\_clc}$)

$D_{sleep}=T_{sleep}+T_{standby})/T_{standby}$, that is, the definition of the duty cycle of the sleep mode duty cycle.

Since the base station transmits the CONNECT message at the $N_{listen}$ subframe so that the call can be completed, and the remote unit therefore must be ready for receiving the messages on the CLC channel at the $N_{listen}$ subframe. The remote unit MAC Layer Access Manager is capable of deriving the $N_{start\_sync}$ subframe number and insures that all hardware required for the remote unit synchronization and CLC scanning efforts are released from sleep mode at that time. This is done, for example, by using a programmable hardware counter 640 that is clocked in synchronism with the TDD subframe of the system, as shown in FIG. 3. Prior to entering the sleep mode, or at the time the sleep mode is entered, CPU 650 preferably uses the least significant 8 bits of the remote unit ID for determining the $N_{listen}$ subframe for the remote unit. CPU 650 loads counter 640 with a value related to $N_{listen}$ and synchronizes counter 640 using a Start Sync signal. Counter 640 provides an interrupt to CPU 650 once every 256 subframes, initiating a re-synchronization process. CPU 650 responds by controlling power supply 660 to provide power 661 to the various components of remote unit used for receiving a CLC CONNECT message. CPU 650 also outputs an enabling signal to the despreading processor 612 to enable the remote unit to receive messages from the base station.

The remote unit begins its re-synchronization effort at a subframe $N_{start\_sync}$ that occurs some determined period of time prior to the occurrence of the $N_{listen}$ subframe. Simulations of the remote unit synchronization algorithms indicate that a remote unit acquires synchronization with a base station when exiting a period of sleep in a minimum time of 122 ms and a maximum time of 200 ms. The actual time additionally depends on hardware component tolerances, the ambient temperature and numerous other factors. For the purposes of this disclosure, a worst case synchronization acquisition time $T_{sync}$ of 200 ms is used. This equates to approximately 34 subframes. Therefore, $N_{start\_sync}=N_{listen}-34$ subframes.

Figure 6:
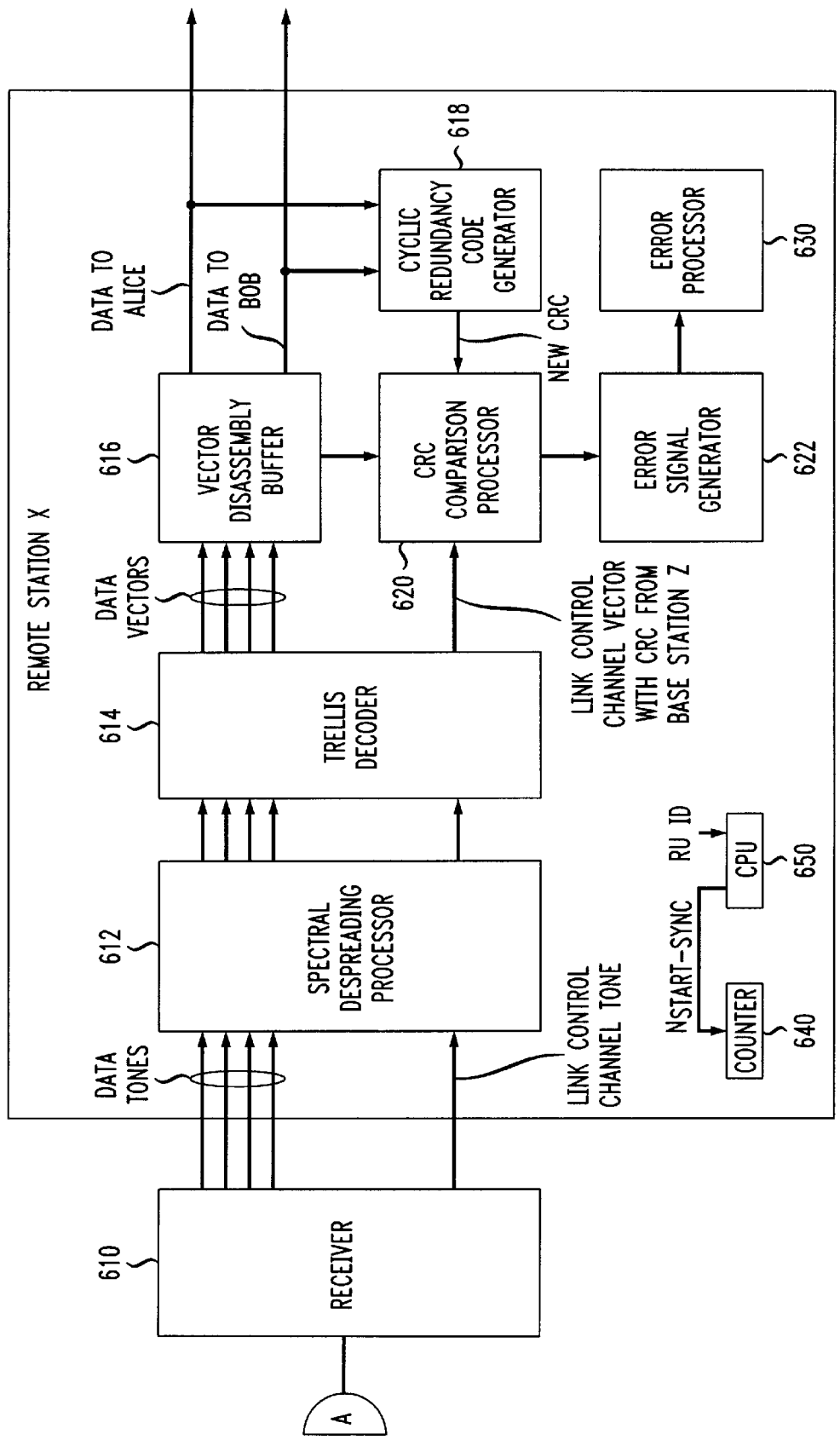
FIG. 6 shows a sequence of events with respect 6 ms subframe structure of the present invention.

FIG. 6 is a timing diagram showing the sequence of events for a remote unit operating in the sleep mode. Each vertical line in FIG. 6 represents a subframe boundary. The time between each subframe boundary is 6 ms. A remote unit is shown as being in a sleep mode. At $N_{start\_sync}$, counter 640 sends an interrupt request to CPU 650 (FIG. 3). CPU 650 responds by controlling power supply 660 to provide power to the various components of the remote unit needed for receiving a CLC CONNECT message. In FIG. 6, the remote unit is in the sleep mode at 60. At 61, $N_{start\_sync}$ occurs and the remote unit resynchronizes for a number of subframes. Preferably, about 34 subframes are required for a remote unit to reacquire synchronization. At $N_{listen}$, the remote unit scans the CLC channel for any CLC CONNECT messages for the remote unit. The remote unit scans for 2 subframes, as shown in FIG. 6 at 62. The remote unit can also be set to scan for a CLC CONNECT message over a different number of subframes other than 2 subframes depending upon system requirements. If no CLC CONNECT message is received at $N_{listen}$, the remote unit returns to the sleep mode at 63. If a CLC CONNECT message is received, the call is established in a normal manner.

As a first illustrative example of the timing aspects of the sleep mode of the present invention, the least significant 8 bits of a remote unit ID are used so that the $N_{listen}$ cycle time is 1536 ms (256×6 ms). The remote unit synchronization acquisition time $N_{sync}$ is estimated to be 34 subframes (204 ms), and a CLC scan time for 2 CLC subframes is chosen. It follows that, $T_{sleep}$=220 subframe times=220×6 ms=1.320 s $T_{sync}$=204 ms=34 subframes×6 ms $T_{scan\_clc}$=12 ms=2 subframes×6 ms $T_{standby}$=212 ms Therefore, the total sleep mode/standby mode cycle time is 1536 ms, and the total remote unit power-on time is 212 ms. The overall duty cycle is 7.25:1. For this example, the maximum delay for delivery of a CONNECT message is 1.530 seconds (1536 ms−6 ms). The nominal CONNECT message delay delivery time is about 0.766 seconds.

Using a longer delay in CONNECT message delivery time permits the remote unit to be in the sleep mode for a greater period of time. As another example, the $N_{listen}$ subframe is determined by using the least significant 9-bits of a remote unit ID. Thus, the $N_{listen}$ interval is 512 subframes. In this example, even though the sleep time is longer, the maximum synchronization acquisition time $T_{sync}$ remains the same. This is based on the fact that any temperature change of the remote unit is not sufficient for requiring a coarse TDD synchronization to be performed. It follows that, $T_{sleep}$=476 subframe times=476×6 ms=2.856 s $T_{sync}$=204 ms=34 subframes×6 ms $T_{scan\_clc}$=12 ms=2 subframes×6 ms $T_{standby}$=212 ms The total sleep mode/standby mode cycle time is 3072 ms (512×6 ms), and the total remote unit power-on time is 212 ms. The overall duty cycle is 14.5:1. For this example, the maximum delay of delivery of a CONNECT message is 3.066 seconds (3072 ms–6 ms). The nominal time for delivery of a CONNECT message is about 1.536 s.

Table I below summarizes various scenarios:

TABLE I

| Sleep Time (ms) | Nominal CLC CONNECT message delay time (ms) | RU Synchronization Time (ms) | RU Power Duty Cycle (approx.) | Battery Runtime (approx. hrs) |
|---|---|---|---|---|
| 1320 | 663 | 220 | 7.25:1 | 11.5 |
| 1320 | 663 | 150 | 9:1 | 12 |
| 2856 | 1428 | 150 | 18:1 | 13.5 |
| 2856 | 1428 | 200 | 14:5 | 13 |
| 2856 | 1428 | 300 | 10:1 | 12 |

The situation of a call originating from a remote unit that is operating in the sleep mode is straight forward compared to the situation when a call terminates at a sleeping remote unit. That is, the remote unit exits the sleep mode in response to a user command. The originating call delivery time, i.e., the time taken for delivering an ACCESS message on the CAC, is delayed by approximately 200 ms since the remote unit must re-acquire synchronization before the ACCESS message may be transmitted.

In normal system operation, a base station polls remote units at a periodic rate for determining status of each remote unit. Each remote unit responds to the Poll Request message with a Poll response message using the CAC channel. When a remote unit is in a sleep mode of operation, the Poll Request message will not be received and, consequently, the remote unit will not respond with a Poll Response message. The present invention provides two alternatives for handling such a situation from the system point of view. The first approach is to always schedule a Poll Request message to arrive at a remote unit during the $N_{listen}$ subframe for the remote unit whether the remote is in the standby or the sleep mode. The remote unit will receive the Poll Request message regardless of AC power status. A disadvantage associated with this approach is that the CAC channel is used by the remote unit for a Poll Response message, causing the remote unit transmitter to be used, effectively wasting battery power when in the sleep mode.

The alternative approach is for a remote unit to ignore the Poll message from the base station during AC power outage situations and allow an OAM&P Layer at the base station to recognize that a non-responsive remote unit may possibly be in the sleep mode and, consequently, be aware of the power status of the remote unit in questions power.

Figure 7:
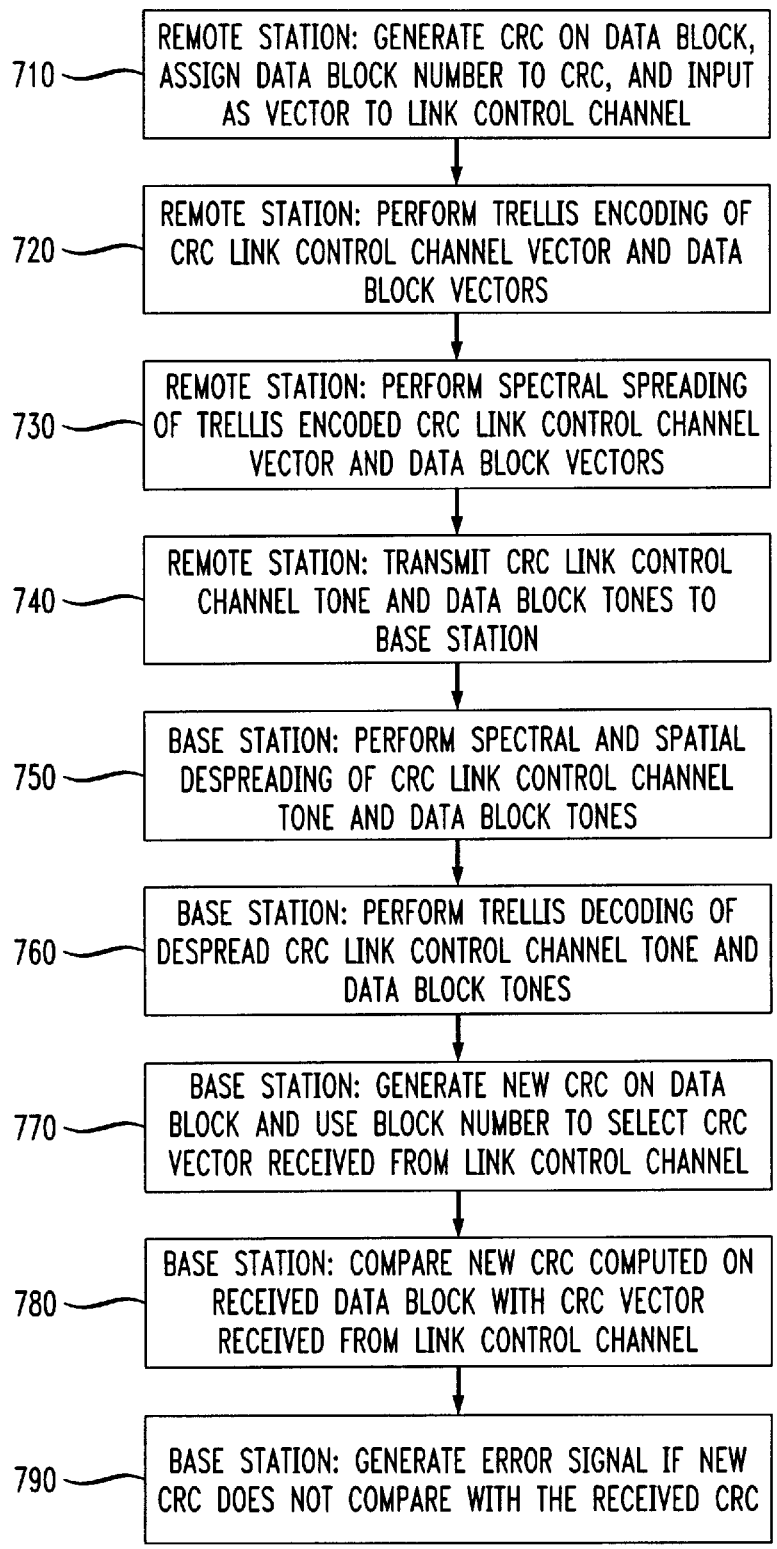
FIG. 7 is an exemplary graph showing Battery Operating Time, measured in hours, for Sleep Mode Duty Cycle (:1)

FIG. 7 is an exemplary graph showing Battery Operating Time, measured in hours, for Sleep Mode Duty Cycle (:1).

From FIG. 7, it is apparent that the length of time that a remote unit is sleeping has a significant impact on the run time of the battery. Also, from FIG. 7, it is also apparent that the battery run time begins to flatten with duty cycle after about a 10:1 ratio. Lab results for simulated sleep mode operation with a new, 7.2 amp-hour battery installed in a prototype uninterruptable power supply have yielded runtimes between 12 hours, 12 minutes to 12 hours, 32 minutes under the conditions that the remote unit is at room temperature, the sleep mode period is set for 3 seconds, and the sleep mode duty cycle is 10:1 (0.3 s standby state and a 2.7 s sleep state).

A remote unit operating in the sleep mode preferably provides the following characteristics:

Sleep time=2856 ms

RU Synchronization Time=200 ms

Call delivery delay=1428 ms nominally

RU CLC Scan time=36 ms (i.e., three slots for flexibility at Base MAC Layer)

Total Cycle Time=3092 ms

Standby Time=236 ms

Duty Cycle=13:1 (approx.)

Battery Operating Time=12.5 hours (approx.)

FIG. 8 is an architectural diagram of the base station as a sender. The PSTN inputs data to base station Z. The data is sent to the vector formation buffer 502 and also to the cyclic redundancy code generator 504. Data vectors are output from buffer 502 to the trellis encoder 506. The data vectors are in the form of a data message formed by concatenating a 64 K-bit data block with its serially assigned block number. The LCC vectors output from the CRC generator 504 to the trellis encoder 506 are in the form of an error detection message formed by concatenating the CRC value with the block number. The trellis encoded data vectors and LCC vectors are then output to the spatial spreading processor 508. The resultant data tones and LCC tones are then output from processor 508 to the transmitter 210 for transmission to the remote station.

The base station transmits the CONNECT message at the $N_{listen}$ subframe so that the call can be completed to the remote unit. The base station knows to send the messages on the CLC channel at the $N_{listen}$ subframe. The base station's MAC Layer Access Manager is capable of deriving the $N_{start\_sync}$ subframe number. This is done, for example, by using a programmable hardware counter 540 that is clocked in synchronism with the TDD subframe of the system, as shown in FIG. 8. When the base station wants to send a message to the remote unit, the CPU 550 preferably uses the least significant 8 bits of the remote unit ID for determining the $N_{listen}$ subframe for the remote unit. CPU 550 loads counter 540 with a value related to $N_{listen}$ and synchronizes counter 540 using a Start Sync signal. Counter 540 provides an interrupt to CPU 550 once every 256 subframes, initiating a re-synchronization process. CPU 550 responds by outputting an enabling signal to the spatial spreading processor 508 to enable the base station to transmit messages to the remote unit when the remote unit is in its standby mode.

Although the preferred embodiments of the invention have been described in detail above, it will be apparent to those of ordinary skill in the art that obvious modifications may be made to the invention without departing from its spirit or essence. Consequently, the preceding description should be taken as illustrative and not restrictive, and the scope of the invention should be determined in view of the following claims.

What is claimed is:

1. A remote unit for a personal wireless area network comprising:

a receiver;

an AC power supply coupled to the receiver and supplying power to the receiver;

a battery-backup power supply coupled to the receiver, the battery-backup power supply becoming operative to supply power to the receiver when the AC power supply fails; and a controller coupled to the receiver, the AC power supply and the battery-backup power supply, the controller detecting when the AC power supply fails and in response controls the receiver and the battery-backup power supply by invoking a sleep mode of operation, the sleep mode operation being periodically interrupted by the controller controlling the receiver and the battery-backup power supply to enter a standby mode of operation in which the receiver scans for a CONNECT message indicating an incoming call, the controller controlling the sleep mode and the standby mode of operations based on a frame count that is generated from an identification number of the remote unit.

2. The remote unit according to claim 1, wherein the receiver scans for a connect message for a predetermined number of subframes of a TDD timing structure.

3. The remote unit according to claim 2, wherein the predetermined number of subframes equals 3.

4. The remote unit according to claim 2, wherein when the remote unit enters the standby mode, the remote unit reacquires synchronization to the TDD timing structure.

5. The remote unit according to claim 4, wherein the remote unit reacquires synchronization to the TDD timing structure in about 34 subframes.

6. The remote unit according to claim 4, wherein the remote unit scans for a CONNECT message at a subframe that is related to an identification number of the remote unit.

7. A method for reducing power consumption of a remote unit in a PWAN system, comprising the steps of:

powering a remote unit using a battery backup power supply when an AC power supply fails at the remote unit;

entering a sleep mode of operation at the remote unit, the sleep mode having a reduced power consumption for the battery backup power supply;

entering a standby mode of operation at the remote unit a predetermined period of time after entering the sleep mode of operation scanning for a CONNECT message indicating an incoming call for the remote unit; and reentering the sleep mode of operation when no CONNECT message is received.

8. The method according to claim 7, further comprising the step of synchronizing the remote unit to a TDD timing structure before the step of entering the standby mode of operation.

9. The method according to claim 8, wherein the predetermined period of time is a predetermined number of subframes after a boundary subframe of the TDD timing structure.

10. The method according to claim 9, wherein the predetermined number of subframes is based on an identification number of the remote unit.

* * * * *